(12) United States Patent
Kim (10) Patent No.: US 9,001,388 B2
(45) Date of Patent: Apr. 7, 2015

(54) IMAGING FORMING APPARATUS TO MERGE PRINT DATA WITH A RENDERING IMAGE, METHOD OF IMAGE FORMING, AND COMPUTER-READABLE RECORDING MEDIUM

(71) Applicant: Samsung Electronics Co., Ltd, Suwon-si, Gyeonggi-do (KR)

(72) Inventor: Haeng-nan Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/088,846

(22) Filed: Nov. 25, 2013

(65) Prior Publication Data

US 2014/0146368 A1    May 29, 2014

(30) Foreign Application Priority Data

Nov. 26, 2012    (KR) .................... 10-2012-0134823

(51) Int. Cl.
*H04N 1/40* (2006.01)
*H04N 1/46* (2006.01)
*H04N 1/60* (2006.01)
*H04N 1/52* (2006.01)
*H04N 1/387* (2006.01)

(52) U.S. Cl.
CPC ............... *H04N 1/6016* (2013.01); *H04N 1/52* (2013.01); *H04N 1/387* (2013.01)

(58) Field of Classification Search
USPC .................... 358/3.06, 534–536, 540
See application file for complete search history.

(56) References Cited

U.S. PATENT DOCUMENTS

| | | | | |
|---|---|---|---|---|
| 6,134,018 A | * | 10/2000 | Dziesietnik et al. | 358/1.15 |
| 6,956,667 B2 | * | 10/2005 | Delhoune et al. | 358/1.18 |
| 8,649,032 B2 | * | 2/2014 | Takenaka | 358/1.13 |
| 2005/0275856 A1 | * | 12/2005 | Oki | 358/1.9 |
| 2011/0158549 A1 | * | 6/2011 | Tanaka | 382/232 |

FOREIGN PATENT DOCUMENTS

| JP | 11-216935 | 8/1999 |
|---|---|---|
| JP | 2006-092101 | 4/2006 |

\* cited by examiner

*Primary Examiner* — Barbara Reinier
(74) *Attorney, Agent, or Firm* — Staas & Halsey LLP (57) ABSTRACT

An image forming apparatus includes a storage unit configured to store a rendering image having a plurality of tones, a communication interface unit configured to receive print data, a rendering unit configured to render the received print data to a bitmap image, a mergence unit configured to merge the bitmap image and the rendering image into a single mergence image, a binary coding unit configured to perform halftoning for the generated mergence image to generate binary data, and a print engine unit configured to form an image on a paper by using the generated binary data.

23 Claims, 11 Drawing Sheets

SyncThru™ Web Service
Samsung SCX-6545 Series

| Jobs | Direct Print | Site Map | Logout | English

🏠 Information | Box | Address Book | Settings | Security | Maintenance

Document Box
- ▼ User Box
  - Common
  - test
- ▶ System Box
  - Secured Received Fax
  - Stored Print
  - Secured Print

User Box
Selected : 0 Total : 2(Max : 100)

[Add Box] [Delete Box] [Ede Box]    [Serch by Name 🔍 ▼] [All ▼]

| Type | Box Name | Owner | File | Size | Date |
|---|---|---|---|---|---|
| ☐ | Common | System | 1 | 1.6MB | 2012-07-17 13:42:52 |
| ☐ | test | test | 0 | 0.0MB | 2012-07-23 16:40:29 |

Details

User Box
- Total : 2(Max : 100)
- Common Box : 1 Box(es)
- Public Box : 0 Box(es)
- Secure Box : 1 Box(es)

Box Usage
- Total : 14.9 GB
- Free Space : 14.9 GB

If you want detail information, please select one.

IMAGING FORMING APPARATUS TO MERGE PRINT DATA WITH A RENDERING IMAGE, METHOD OF IMAGE FORMING, AND COMPUTER-READABLE RECORDING MEDIUM

CROSS-REFERENCE TO RELATED APPLICATIONS

This application claims priority under 35 U.S.C. §119 from Korean Patent Application No. 10-2012-0134823, filed Nov. 26, 2012 in the Korean Intellectual Property Office, the disclosure of which is incorporated herein by reference in its entirety.

BACKGROUND OF THE INVENTION

1. Field of the Invention

The present general inventive concept relates to an image forming apparatus, a method of forming an image, and a computer-readable recording medium, and more particularly to an image forming apparatus that can synthesize print data without decreasing image quality and print the data, a method of editing printed documents, and a computer-readable recording medium.

2. Description of the Related Art

An image forming apparatus means an apparatus which prints print data generated by a terminal device such as a computer onto a print paper. An image forming apparatus may include, as an example, a copier, a printer, a facsimile machine or a multi-functional peripheral (MFP) which complexly implements the functions of the copier, the printer and the facsimile machine in one device.

Recent image forming apparatuses support an image synthesis technique in the image forming apparatus itself, and a user selects one of prestored form data to edit print data to be copied or printed. For example, a user can perform a synthesis to insert a security document watermark into print data requiring security, or to insert various designs into print document edges.

A conventional technology supports two methods of such synthesis. In the first method, an image to be used as a form image is converted to a digital image via a scanner and stored, and print data is synthesized with the stored form image and then printed when a copying or printing job is performed.

In the second method, a form is generated with a page description language (PDL) via a particular application and a driver, is stored in an image forming apparatus, and when print data with the same PDL is received, the print data is synthesized with the form and then printed.

However, according to the first method, quality is decreased due to color conversion or resolution difference when a scanned image is synthesized with halftoned print data.

According to the second method, a form image as PDL itself is stored to reduce quality loss, but the form image cannot be used in an image forming apparatus with different print languages since the form image is stored in the form of PDL data.

SUMMARY OF THE INVENTION

The present general inventive concept provides an image forming apparatus that can synthesize print data without decreasing image quality and print the data, a method of forming an image and a computer-readable recording medium.

Additional features and utilities of the present general inventive concept will be set forth in part in the description which follows and, in part, will be obvious from the description, or may be learned by practice of the general inventive concept.

Exemplary embodiments of the present general inventive concept provide an image forming apparatus including a storage unit configured to store a rendering image having a plurality of tones, a communication interface unit configured to receive print data, a rendering unit configured to render the received print data to a bitmap image, a mergence unit configured to merge the bitmap image and the rendering image into a single mergence image, a binary coding unit configured to perform halftoning for the generated mergence image to generate binary data, and a print engine unit configured to form an image on a paper by using the generated binary data.

The storage unit may store a plurality of rendering images, and the communication interface unit may receive information on one of the plurality of rendering images to be merged with the print data.

The image forming apparatus may further include a control unit configured to store the rendered bitmap image as an additional rendering image in the storage unit.

The control unit may compress the rendered bitmap image to store the rendered bitmap image in the storage unit.

The rendering image may have an RGB format with 8 bit tones.

The mergence unit may Raster Operation Processing (ROP)-operate the bitmap image and the rendered image to merge the images.

The communication interface unit may receive a mergence condition of the print data and the rendering image, and the mergence unit may merge the bitmap image and the rendering image based on the received mergence condition.

The image forming apparatus may further include: a user interface unit configured to receive a selection of a mergence condition of the print data and the rendering image, and the mergence unit may merge the bitmap image and the rendering image based on the received mergence condition.

The mergence condition may be a transparency of the rendering image for the print data.

The binary coding unit may convert the color of the generated mergence image into a CMYK image, and perform halftoning to the CMYK image to generate binary data.

Exemplary embodiments of the present general inventive concept provide a method of forming an image with an image forming apparatus, the method including receiving print data, rendering the received print data to a bitmap image, merging the bitmap image and a rendering image having a plurality of tones prestored in the image forming apparatus to generate a single mergence image, performing a halftoning for the generated mergence image to generate binary data, and forming an image on a print paper by using the generated binary data.

The method may further include: storing a plurality of rendering images, and receiving information of a rendering image to be merged with the print data among the plurality of rendering images.

The method of forming an image may further include: storing the rendered bitmap image as an additional rendering image in the image forming apparatus.

The storing may compress the rendered bitmap image to store the rendered bitmap image in the image forming apparatus.

The rendering image may have an RGB format with 8 bit tones.

The merging may ROP-operate the bitmap image and the rendered image to merge the images.

The method may further include: receiving a mergence condition of the print data and the rendering image, and the merging may merge the bitmap image and the rendering image based on the received mergence condition.

The method of forming an image may further include: receiving a selection of a mergence condition of the print data and the rendering image, and the merging may merge the bitmap image and the rendering image based on the received mergence condition.

The mergence condition may be a transparency of the rendering image for the print data.

The generating binary data may convert the color of the generated mergence image into a CMYK image, and perform halftoning to the CMYK image to generate binary data.

Exemplary embodiments of the present general inventive concept provide a computer-readable recording medium including computer-readable codes as a program to execute the method of forming an image.

Exemplary embodiments of the present general inventive concept provide an image forming apparatus, including a mergence unit configured to merge a currently rendered image and a previously rendered image into a single mergence image, a binary coding unit configured to generate binary data by performing halftoning on the mergence image, and a print engine unit configured to form an image using the generated binary data.

The mergence unit may be configured to merge the currently rendered image and the previously rendered image through an Exclusive Or operation.

The mergence unit may be configured to merge the currently rendered image and the previously rendered image according to a mergence condition, and the mergence condition may be at least one of transparency of at least one of the currently rendered image and the previously rendered image, an orientation of at least one of the currently rendered image and the previously rendered image, an area of the mergence image in which the currently rendered image and the previously rendered image are merged, and an area of the mergence image in which the currently rendered image and the previously rendered image are not merged.

Exemplary embodiments of the present general inventive concept provide a method of forming an image, the method including merging a currently rendered image and a previously rendered image to generate a single mergence image, generating binary data by performing halftoning on the mergence image, and forming an image using the generated binary data.

The currently rendered image and the previously rendered image may be merged through an Exclusive Or operation.

The currently rendered image and the previously rendered image may be merged according to a mergence condition, and the mergence condition may be at least one of a transparency of at least one of the currently rendered image and the previously rendered image, an orientation of at least one of the currently rendered image and the previously rendered image, an area of the mergence image in which the currently rendered image and the previously rendered image are merged, and an area of the mergence image in which the currently rendered image and the previously rendered image are not merged.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 1:
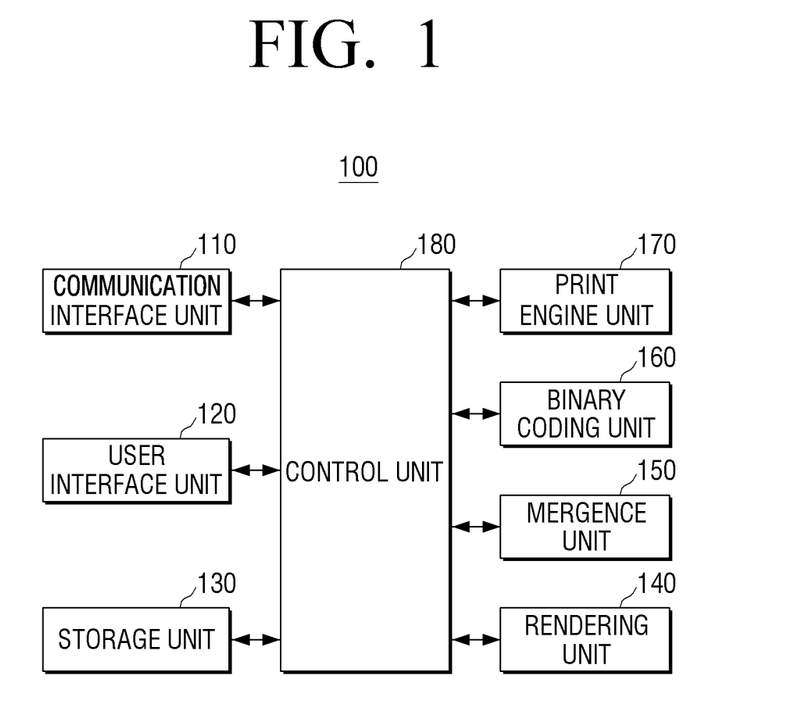
FIG. 1 is a block diagram illustrating an image forming apparatus according to an exemplary embodiment of the present general inventive concept.

FIG. 1 is a block diagram illustrating an image forming apparatus 100 according to an exemplary embodiment of the present general inventive concept.

Referring to FIG. 1, the image forming apparatus 100 includes a communication interface unit 110, a user interface unit 120, a storage unit 130, a rendering unit 140, a mergence unit 150, a binary coding unit 160, a print engine unit 170 and a control unit 180. The image forming apparatus 100 may be a copier, a printer, a facsimile machine or a multi-functional peripheral (MFP) which complexly implements the functions of the copier, the printer and the facsimile machine in one device.

The communication interface unit 110 is configured to connect the image forming apparatus 100 to a print control terminal device 10 (illustrated in FIG. 3), and may be connected for example via a universal serial bus (USB), a local area network (LAN), or an internet network.

The communication interface unit 110 may receive print data from the print control terminal device 10. The print data may be data of print languages such as postscript (PS) and printer control language (PCL), and if the image forming apparatus 100 supports direct printing, the print data may be the file itself such as PDF, XPS, BMP, JPG and text document (TXT). The print data received at this time may be used as form data later. The print control terminal device 10 may be, for example, a PC, a laptop computer or a tablet PC.

The communication interface unit 110 may receive information on form data (i.e. rendering image, hereinafter, it will be referred to as "rendering image") to be merged with the currently transmitted print data among a plurality of rendering images from the print control terminal device 10. In addition, the communication interface unit 110 may receive a selection of a mergence condition of the print data and the rendering image from the print control terminal device 10. The information of a rendering image to be merged and the mergence condition may be received with a Printer Job Language (PJL) command. Meanwhile, the information on a rendering image and the mergence condition may be received as a single print data, not as separate data. In other words, the print data may include information on a rendering image and information on a mergence condition.

The communication interface unit 110 may transmit a user interface window to select a mergence condition to a print control terminal device 10, and may transmit a user interface window to select a rendering image to be merged with print data among a plurality of stored rendering images to a print control terminal device 10.

The user interface unit 120 comprises a plurality of function keys so that a user can set or select various functions provided by an image forming apparatus, and may display various kinds of information provided by an image forming apparatus 100. The user interface unit 120 may be implemented as a combination with a monitor or a mouse, or implemented as a device, which executes input and output concurrently, such as a touch screen.

The user interface unit 120 may receive a selection of a rendering image to be merged with print data from among a plurality of prestored rendering images. The user interface unit 120 may receive a mergence condition of a selected one of the plurality of rendering images and the received print data. The mergence condition may be a transparency of a rendering image for print data. Hereinafter, the mergence condition is assumed to be a transparency, but the mergence condition may include information of a page to be applied in the printed pages of print data and information on an area to which mergence will be conducted in the page to be applied. In addition, the mergence condition may be used as an edition factor of print data as well as a transparency condition. For example, a condition may be received to output an image of print data on the upper area of page 1 and output a prestored rendering image on the lower area of page 1.

The storage unit 130 stores print data. In detail, the storage unit 130 stores print data received via the communication interface unit 110. The storage unit 130 may store data (e.g. bitmap image, rendering image, CMYK data with a plurality of tones, CMYK data (binary data) with 1 bit tone) which are processed by the rendering unit 140, the mergence unit 150, and the binary coding unit 160, which will be explained later. A rendering image is RGB data having a plurality of tone values and has the same data format as the aforementioned bitmap image. Hereinafter, for convenience of explanation, the source of mergence (i.e. rendering image for print data to be immediately printed) is referred to as a bitmap image, and the objective of mergence (form data) is referred to a rendering image.

The storage unit 130 may be implemented as a removable storage medium to be detachably attached or inserted into the image forming apparatus 100, for example as a removable disk such as a Universal Serial Bus (USB) memory or a web server through a network. In the current exemplary embodiment, only one storage unit 130 is illustrated and explained, but the storage unit 130 may be implemented as one memory for storing data and a separate memory for processing commands.

The storage unit 130 may store the print data rendered by the rendering unit 140, which will be explained later, as a rendering image (i.e. form data). At this time, the storage unit 130 may store the storage address of the rendering image, and the form ID and name of the rendering image as a lookup table. The storage unit 130 may store compressed data for the rendering print data to reduce the storage space of the rendering image.

The rendering unit 140 renders the received print data as a bitmap image. In detail, the rendering unit 140 performs rendering for the print data received from a print control terminal device 10 to generate a bitmap image. At this time, the rendering unit 140 may perform rendering to a bitmap image having a resolution supported by the print engine unit 170, which will be explained later, and if the print data has a higher resolution than that supported by the print engine unit 170, the rendering unit 140 may also perform rendering to a bitmap image having an inherent resolution of the print data. The bitmap image may be temporarily stored in the storage unit 130.

The bitmap image may be temporarily stored in the storage unit 130 as form data as explained above. Since form data is stored as a rendering image having a plurality of tones, this may reduce a color loss that may be generated while synthesizing two images during the mergence process, which will be explained later, and in a different kind of apparatus, the rendering image stored in the storage unit 130 may be easily used.

The mergence unit 150 merges a bitmap image and a rendering image to generate a single merged image. In detail, the mergence unit 150 has a function of Raster Operation Processing (ROP, explained below in relation to FIG. 8). The mergence unit 150 performs an ROP operation on a selected rendering image and a bitmap image rendered by the rendering unit 140 to generate a merged image according to the received mergence condition. Two images are merged according to the above process, and thus a loss during a synthesis stage can be reduced. In other words, the merged rendering image is an image before color conversion (e.g. an image converted to CMYK or binary-coded image), and thus a color loss during a synthesis process can be reduced. The mergence unit 150 may be implemented as System on Chip (SoC).

The binary coding unit 160 performs halftoning for a bitmap image to generate a binary data (or binary-coded data). In detail, the binary coding unit 160 performs halftoning, such as color conversion, screening and dithering, for a bitmap image rendered by the rendering unit 140 or a mergence image merged by the mergence unit 150 to generate a binary data.

In more detail, the binary coding unit 160 may perform a color conversion to CMYK for the merged bitmap image, and perform halftoning for the color-converted mergence image to generate a binary data. If the merged image is a black-and-white image, i.e. the image is not a color image, the aforementioned color conversion process may be omitted. The binary data may be temporarily stored in the storage unit 130.

The print engine unit 170 forms an image on a print paper by using the generated binary data. The print engine unit 170 may perform a print work according to a printing operation such as a laser operation or an inkjet operation.

The control unit 180 controls each constitutional element in the image forming apparatus 100. In detail, the control unit 180 may control the storage unit 130 to temporarily store the received print data if print data is received from the print control terminal device 10.

If the received print data is data to be used as form data, the control unit 180 may store the rendered print data as a rendering image (i.e. form data) in the storage unit 130. At this time, the control unit 180 may compress the rendering image to store in the storage unit 130.

The control unit 180 may control the rendering unit 140 to perform rendering for the print data, and if a mergence command for print data is received together, the control unit 180 may control the mergence unit 150 to merge the rendered bitmap image and the prestored rendering image.

The control unit 180 may control the binary coding unit 160 and the print engine unit 170 so that a rendered bitmap image or a merged bitmap image can be printed.

As explained above, an image forming apparatus 100 according to an exemplary embodiment of the present general inventive concept stores form data as a rendering image having a plurality of tones, and thus the rendering image stored in the image forming apparatus 100 can be used in a different kind of apparatus. In addition, the print data and form data are merged right after rendering, and thus a loss during a synthesis operation can be reduced.

Figure 2:
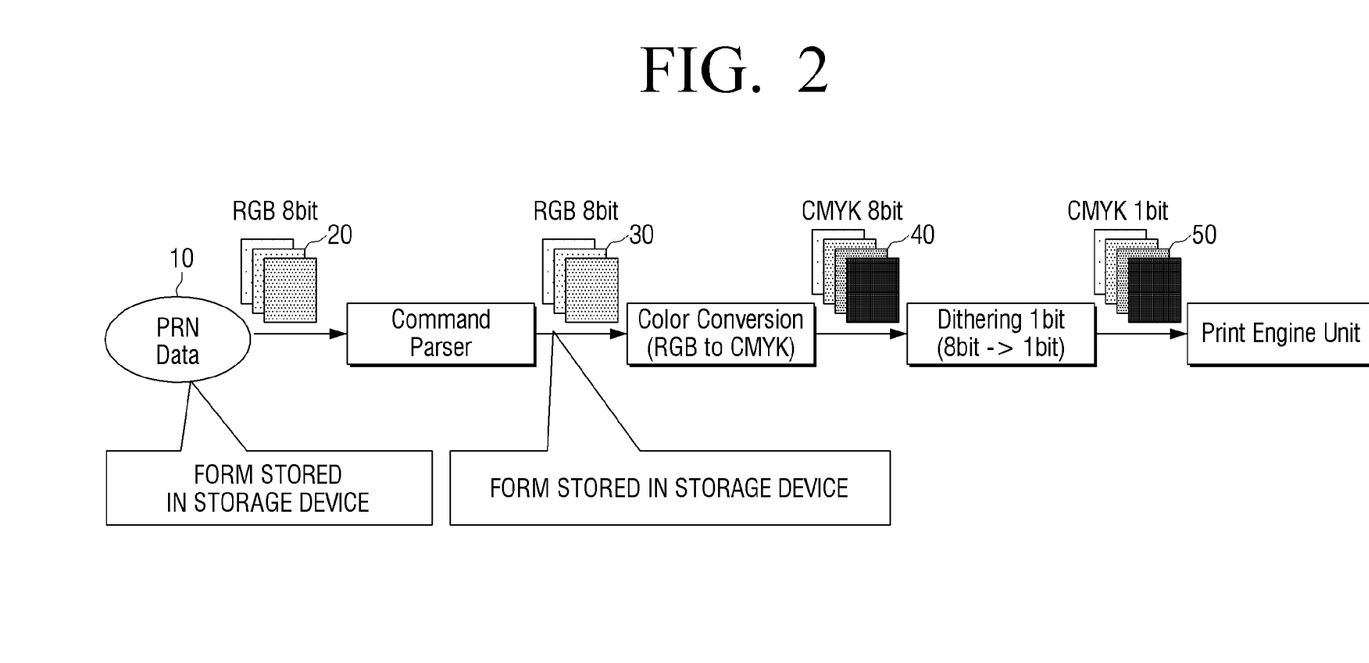
FIG. 2 is a view illustrating a process of print data according to an exemplary embodiment of the present general inventive concept.

FIG. 2 is a view illustrating a process of print data 20 according to an exemplary embodiment of the present general inventive concept.

Referring to FIGS. 1 and 2, print data 20 is transferred from a print control terminal device 10 to an image forming apparatus 100. In general, at a printer driver of a print control terminal device 10, based on data that is expressed as RGB data with 8 bit tones, print data 20 expressed as PDL based on PDL specification is generated and is transmitted to the print engine unit 170 of the image forming apparatus 100.

The image forming apparatus 100 receiving the print data 20 performs rendering to generate a RGB bitmap image 30 with 8 bit tones. The RGB bitmap image 30 with 8 bit tones may be stored as form data in the storage unit 130 according to a command parser, which parses a command corresponding to the print data 20.

Accordingly, the currently received print data and the prestored form data are the same RGB bitmap image 30 with 8 bit tones.

Thereafter, two RGB bitmap images 20 are merged, the merged RGB data with 8 bit tones is converted to CMYK data 40 with 8 bit tones through a color conversion, and the data is converted to CMYK data 50 with 1 bit tone through a dithering process, and then the data is provided to the print engine unit 170 of the image forming apparatus 100.

It is possible that form data is stored as PDL data or as an image with a single tone. However, due to the property of an image forming apparatus having a subtractive color model, color converting from RGB data to CMYK results in a color loss, and expressing 8 bit data as 1 bit data causes quality loss. However, in the current exemplary embodiment, form data is stored as a rendering image before color loss, and thus a loss during a mergence process can be reduced.

In addition, form data is stored as an image (such as a bitmap image), not PDL data, and thus the form data can be easily called and used in PDL of a different kind of apparatus.

Figure 3:
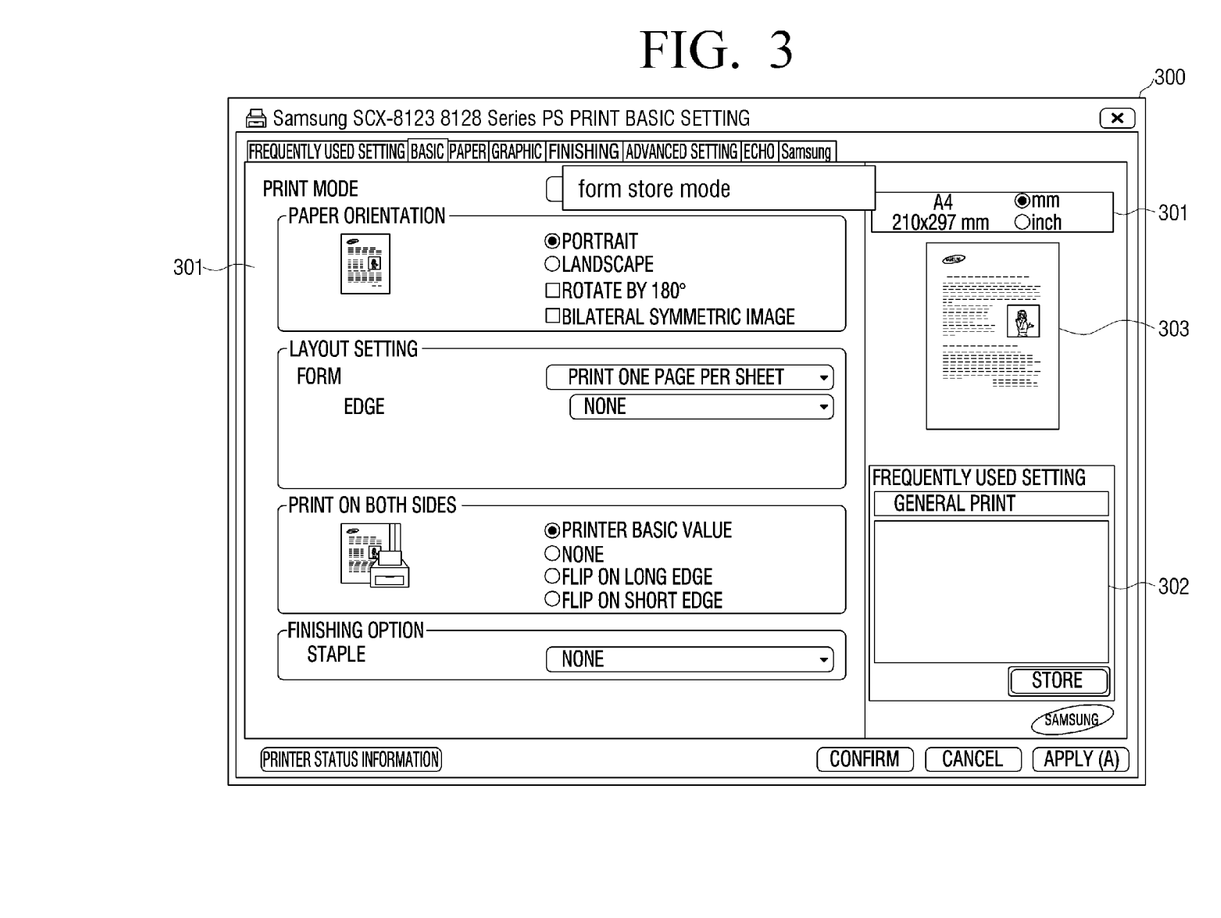
FIGS. 3 and 4 are views illustrating examples of a user interface window which can be displayed in a host device according to an exemplary embodiment of the present general inventive concept.
Figure 4:
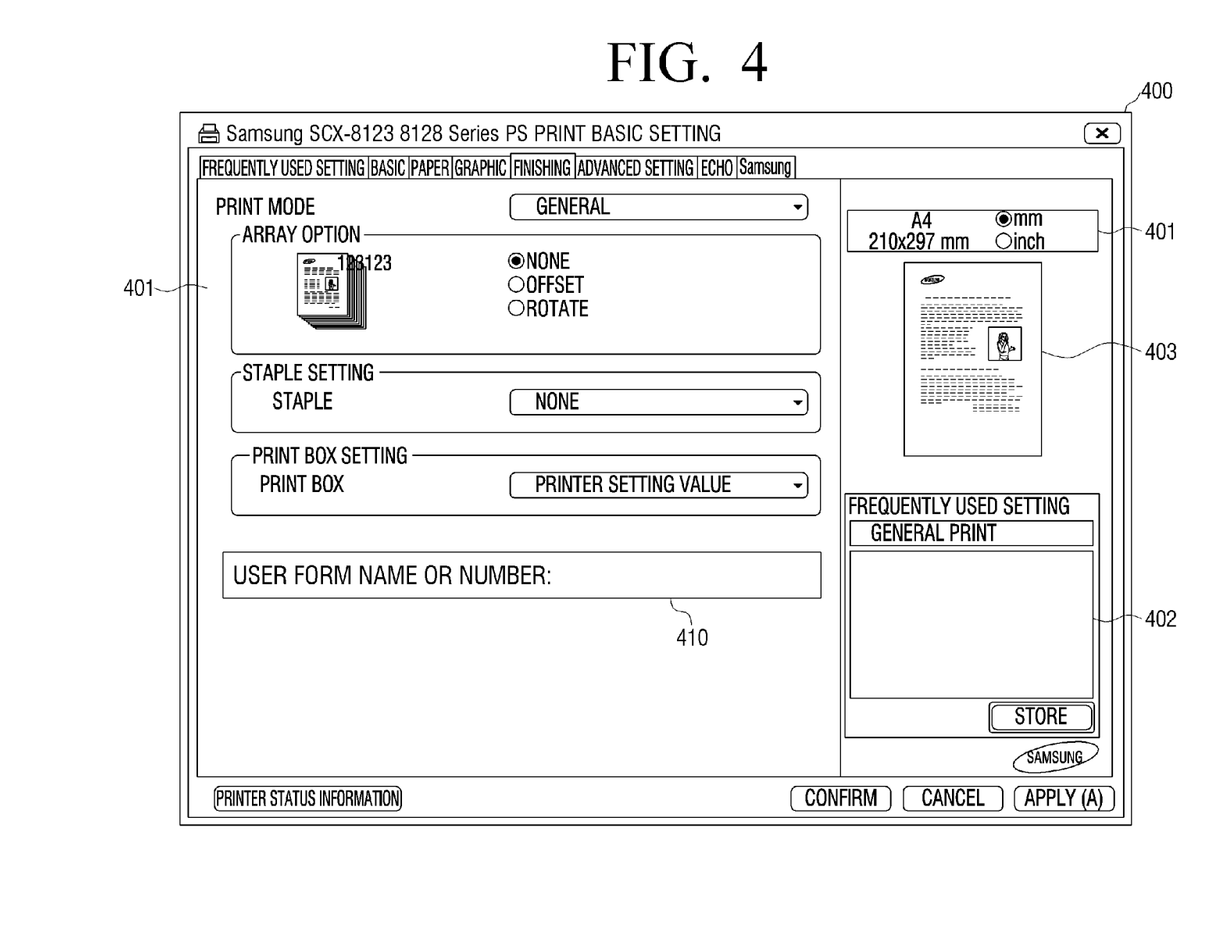

FIGS. 3 and 4 are views illustrating examples of user interface windows 300 and 400 which can be displayed in a print control terminal device according to an exemplary embodiment of the present general inventive concept.

In detail, FIG. 3 illustrates an example of a user interface window 300 of a print control terminal device 10 of FIG. 2 in an operation of storing a form or form data.

Referring to FIG. 3, a user inputs a print command on a document to be used as form data, and selects an option that the document should be used as form data on a print option window (corresponding to the user interface window 300). At this time, the user interface window 300 may receive an ID or name of the form data.

Thereafter, the print driver of the print control terminal device 10 generates the document as print data and transmits the generated print data to an image forming apparatus 100. At this time, the print control terminal device 10 notifies that the print data will be used as form data.

The image forming apparatus 100 receiving the print data may perform rendering for the received print data, generate a rendering image for the received print data and store the generated rendering image as form data.

The user interface window 300 may include sections 301 for setting the print mode such as the paper orientation, the layout of the document, number of pages per sheet, whether to print on both sides or staple, and what type of paper to use. It may further include a list of frequently used settings 302 stored for easy access, and a preview view 303 of the printed document.

In detail, FIG. 4 illustrates an example of a user interface window 400 of a print control terminal device 10 of FIG. 2 which inputs a print command by using a stored form.

Referring to FIG. 4, if a user inputs a print command for a document in a print control terminal device, the user interface window 400 is displayed to receive a print option for the document.

A user may input the name or number of a form which will be applied to the document on the displayed user interface window 400. Thereafter, if a confirmation command is received, a print driver generates print data for the selected document, and transmits the generated print data and information on the form data applied to the document to an image forming apparatus.

The user interface window 400 may include sections 401 for setting the print mode such as the arraying option, a staple setting, a print box setting, and what type of paper to use. It may further include a list of frequently used settings 402 and a preview view 403 of the printed document, as well as a window 410 to enter the user's form name or number.

The subsequent operations have been explained with regard to FIGS. 1 and 2, and thus redundant explanation will be omitted.

With regard to FIGS. 3 and 4, it has been explained that a print control terminal device transmits form data and selects information on the form data to be applied. However, transmitting form data and selecting form data may be performed in a System Web Server (SWS) as well as an image forming apparatus itself.

In detail, the image forming apparatus 100 may store print data, a user interface unit of the image forming apparatus 100 may select so that one of prestored print data can be used as form data, and the user interface unit of the image forming apparatus 100 may select form data to be applied to the prestored print data or form data to be applied to the received print data. Meanwhile, an example of using an SWS will be explained later by referring to FIG. 5.

Figure 5:
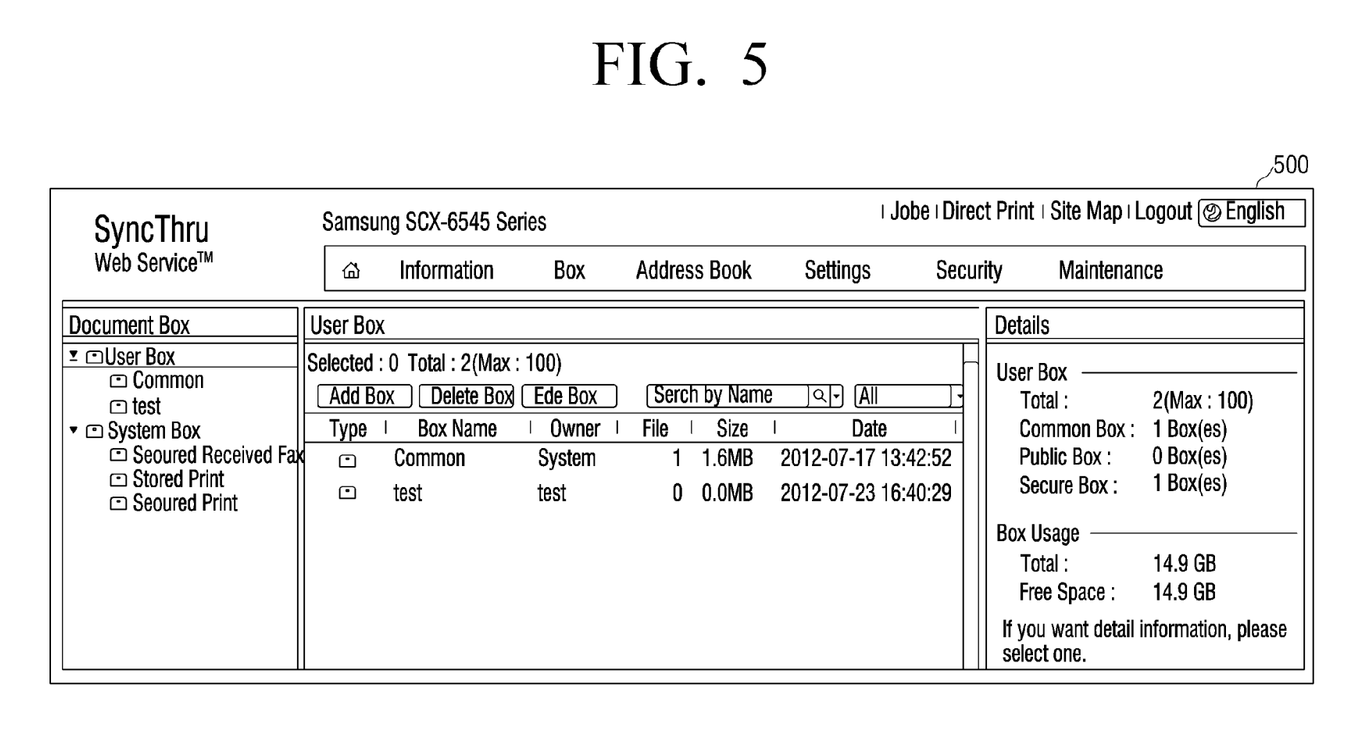
FIGS. 5 and 6 are views illustrating examples of web pages provided by a System Web Server (SWS) according to an exemplary embodiment of the present general inventive concept.
Figure 6:
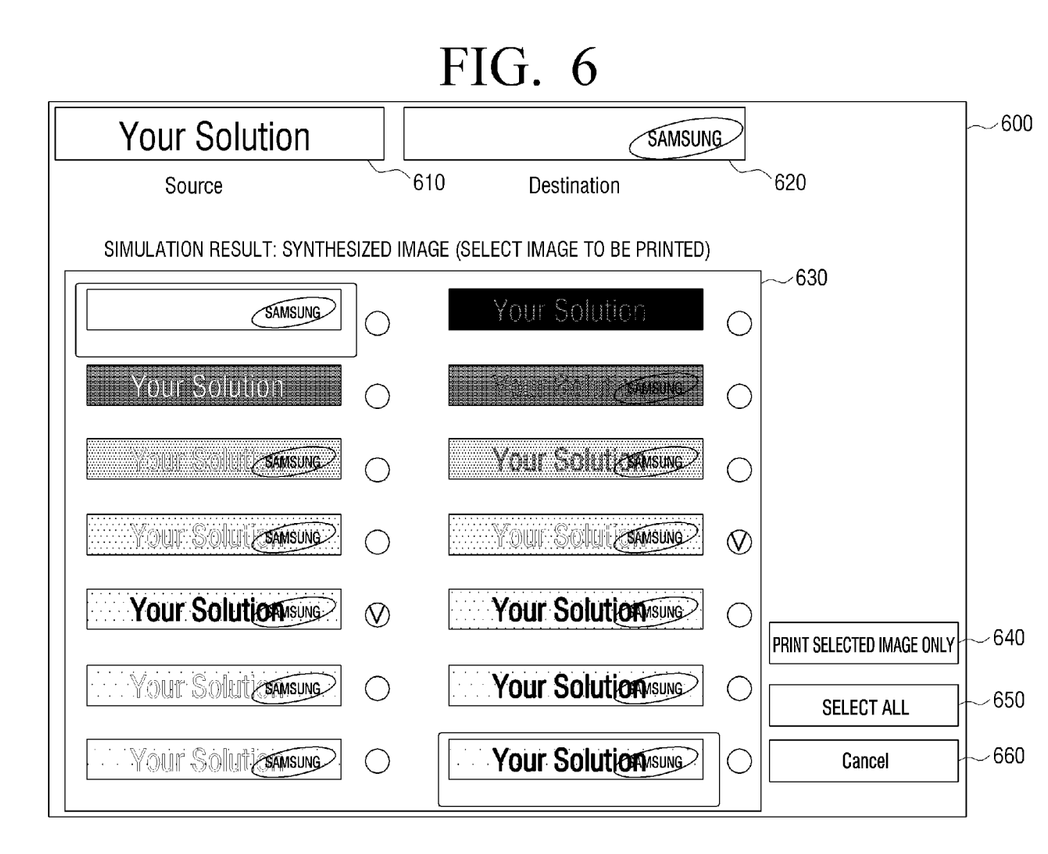

FIGS. 5 and 6 are views illustrating examples of web pages 500 and 600 provided by an SWS according to an exemplary embodiment of the present general inventive concept.

Referring to FIG. 5, the SWS displays a list of a plurality of form data stored in the image forming apparatus 100. In detail, if an external device is connected to the SWS, the SWS may provide a list of a plurality of form data stored in the image forming apparatus 100 in the form of a web page 500.

Accordingly, a user of the external device may select one of the plurality of form data to be applied to a web page. The SWS may be provided in the image forming apparatus 100 or as an external apparatus.

If form data to be applied is selected, the SWS may receive a selection as to how the form data is merged to the document. In detail, a web page 600 as illustrated in FIG. 6 may be further provided.

Referring to FIG. 6, the web page 600 displays a document 610, to which print work is performed, and form data 620, which will be merged. The web page 600 displays various mergence examples 630 for the document 610 and the form data 620 so as to receive a mergence condition from a user.

With regard to FIGS. 5 and 6, it has been explained that the aforementioned web page is displayed on an external device via an SWS. However, the web page in FIGS. 5 and 6 may be displayed as a user interface window in an image forming apparatus 100.

Figure 7:
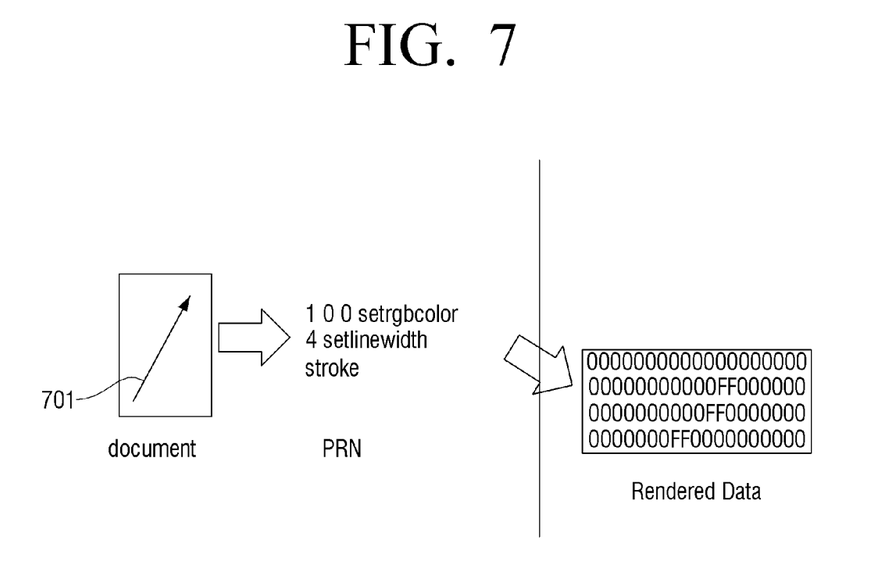
FIG. 7 is a view illustrating a rendering image according to an exemplary embodiment of the present general inventive concept.

FIG. 7 is a view illustrating a rendering image according to an exemplary embodiment of the present general inventive concept.

The rendering image according to an exemplary embodiment of the present general inventive concept means that 1 pixel is expressed as R, G, B, each having 8 bits, and is stored, i.e. data before a loss.

For example, if a red line 701 is drawn in a document as illustrated in FIG. 7, the red line 701 may be expressed as print data of "100 setrgbcolor 4 setlinewidth stroke." In this regard, an image forming apparatus according to an exemplary embodiment of the present general inventive concept performs rendering for the received print data and stores the rendered data as RGB data of 8 bits.

Figure 8:
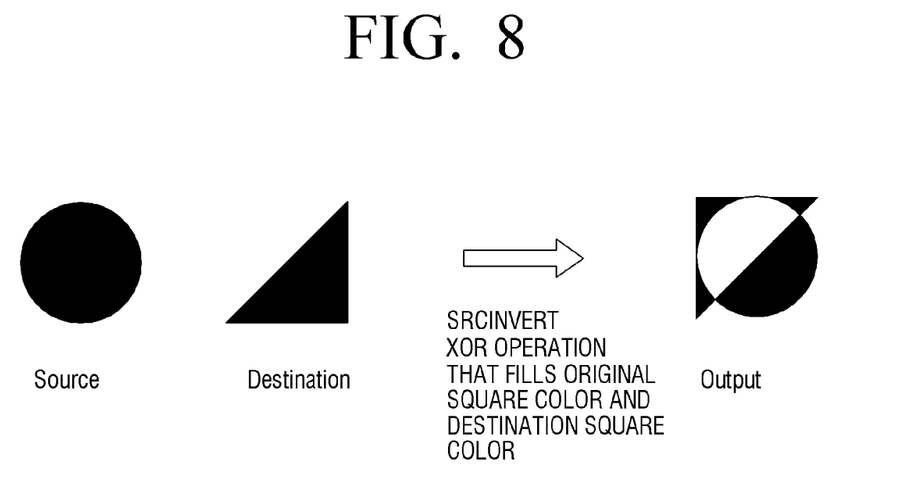
FIG. 8 is a view illustrating an operation of the mergence unit of FIG. 1.

FIG. 8 is a view to explain an operation of the mergence unit 150 of FIG. 1.

Referring to FIG. 8, a rendering image and a bitmap image are ROP-operated. In detail, each of a rendering image and a bitmap image is RGB data with 8 bit tones, and thus these images may be merged during a ROP operation such as Bit-Blit.

An ROP operation means more effectively expressing a bitmap through various logic operations between pixels by determining a synthesis method between two pixels when one pixel is put on another pixel. For example, as illustrated in FIG. 8, a circular object and a triangular object may be generated as an object in which a circle and a triangle are merged via an Exclusive Or (XOR) operation.

Figure 9:
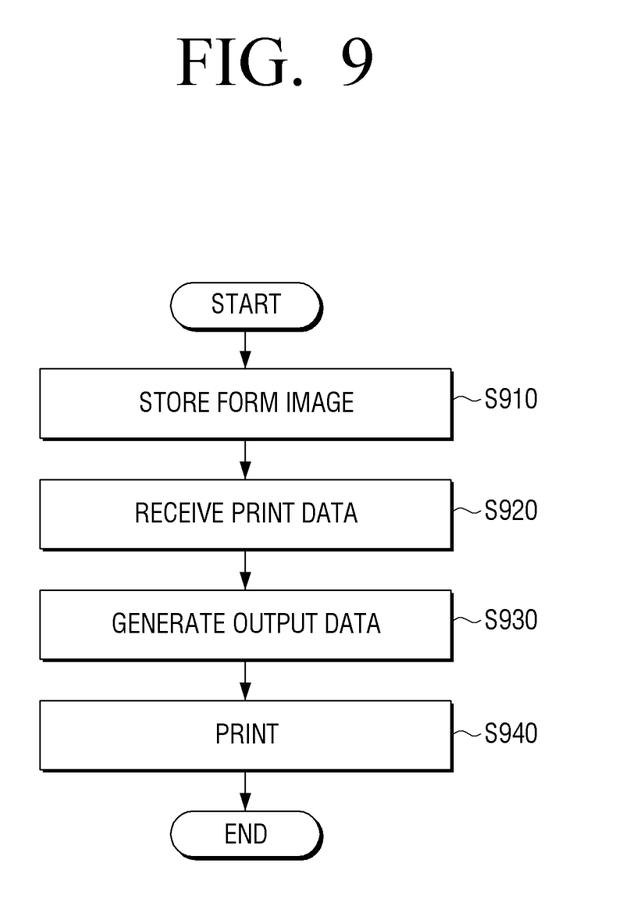
FIG. 9 is a view illustrating a method of forming an image according to an exemplary embodiment of the present general inventive concept.

FIG. 9 is a view illustrating a method of forming an image according to an exemplary embodiment of the present general inventive concept.

Referring to FIG. 9, a rendering image is stored as form data (Operation S910). An image forming apparatus 100 may store a plurality of rendering images.

The image forming apparatus 100 receives print data (Operation S920). In detail, the image forming apparatus 100 may receive print data from a print control terminal device or via a mobile storage medium. At this time, the image forming apparatus may receive information of a rendering image to be merged to the print data and a mergence condition together with the print data.

The image forming apparatus 100 generates output data (Operation S930). In detail, the image forming apparatus performs rendering for the received print data to generate a bitmap image, merges the generated bitmap image and a bitmap image with a plurality of tones into a single merged image, and performs halftoning for the generated merged image to generate binary data, which is output data.

The image forming apparatus 100 prints, that is, it forms an image on a print paper, by using the generated binary data (Operation S940).

The method of forming an image according to an exemplary embodiment of the present general inventive concept includes storing form data as a rendering image having a plurality of tones, and thus the rendering image stored in the image forming apparatus 100 can be used in a different kind of apparatus. In addition, since print data and form data are merged right after rendering, a loss during a synthesis process can be reduced. The method of forming an image in FIG. 9 can be implemented in an image forming apparatus having the configuration of FIG. 1, and can also be implemented in other image forming apparatuses having different configurations.

The method of forming an image as explained above may be implemented as a program (or application) having algorithm executable in a computer, and the program may be stored and provided in a non-transitory computer readable medium.

Figure 10:
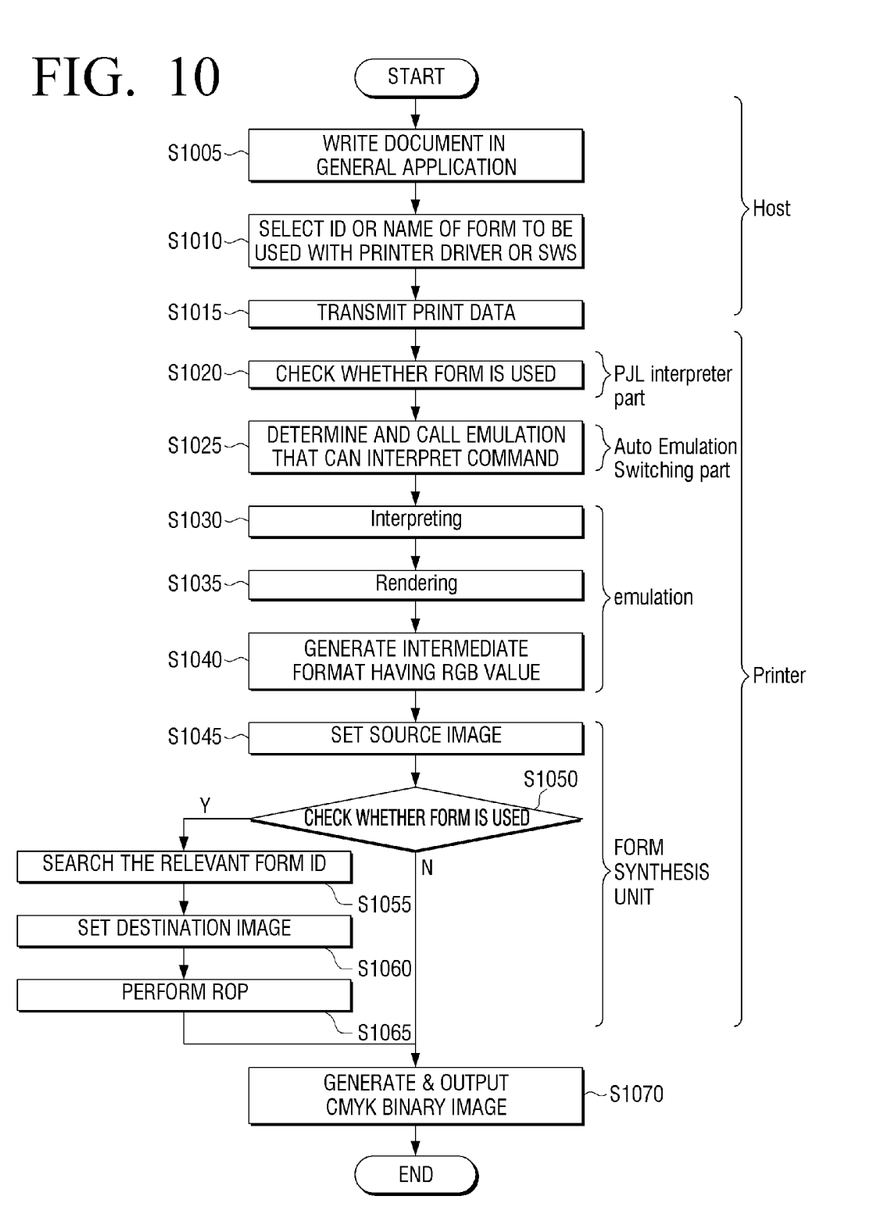
FIG. 10 is a flowchart illustrating in detail a method of forming an image according to an exemplary embodiment of the present general inventive concept.

FIG. 10 is a flowchart illustrating in detail a method of forming an image according to an exemplary embodiment of the present general inventive concept.

Referring to FIG. 10, a print control terminal device writes a document to be printed (Operation S1005), and a print driver or SWS selects the form data to be applied to the document (Operation S1010). If a print command for the written document is received, print data for the document is generated, and information on the generated data and form data is transmitted to an image forming apparatus 100 (Operation S1015).

The image forming apparatus 100 receiving the print data analyzes PJL command of the received print data and determines whether a mergence operation for the print data should be performed (Operation S1020).

The image forming apparatus 100 determines an emulation suitable for the print data and calls the emulation (Operation S1025).

The image forming apparatus 100 performs interpretation (Operation S1030) and rendering (Operation S1035) for the selected print data by using the called emulation and generates a bitmap image having a plurality of tones (i.e. RGB data of 8 bits) (Operation S1040).

The image forming apparatus 100 temporarily stores the generated bitmap image as a source image in a storage unit (Operation S1045), and if it is not necessary to use form data (Operation S1050-N), the image forming apparatus 100 performs halftoning for the source image to generate binary data and performs print work by using the generated binary data (Operation S1070).

If it is necessary to use form data (Operation S1050-Y), the image forming apparatus 100 searches a rendering image to be applied by using the form ID selected by the print control terminal device (Operation S1055), sets the applicable rendering image as a destination image (Operation S1060), and performs ROP for the searched rendering image and the pre-rendered bitmap image to generate a merged image (Operation S1065).

The image forming apparatus 100 performs color conversion and halftoning for the merged image to generate binary data, and performs print work by using the generated binary data (Operation S1070).

Figure 11:
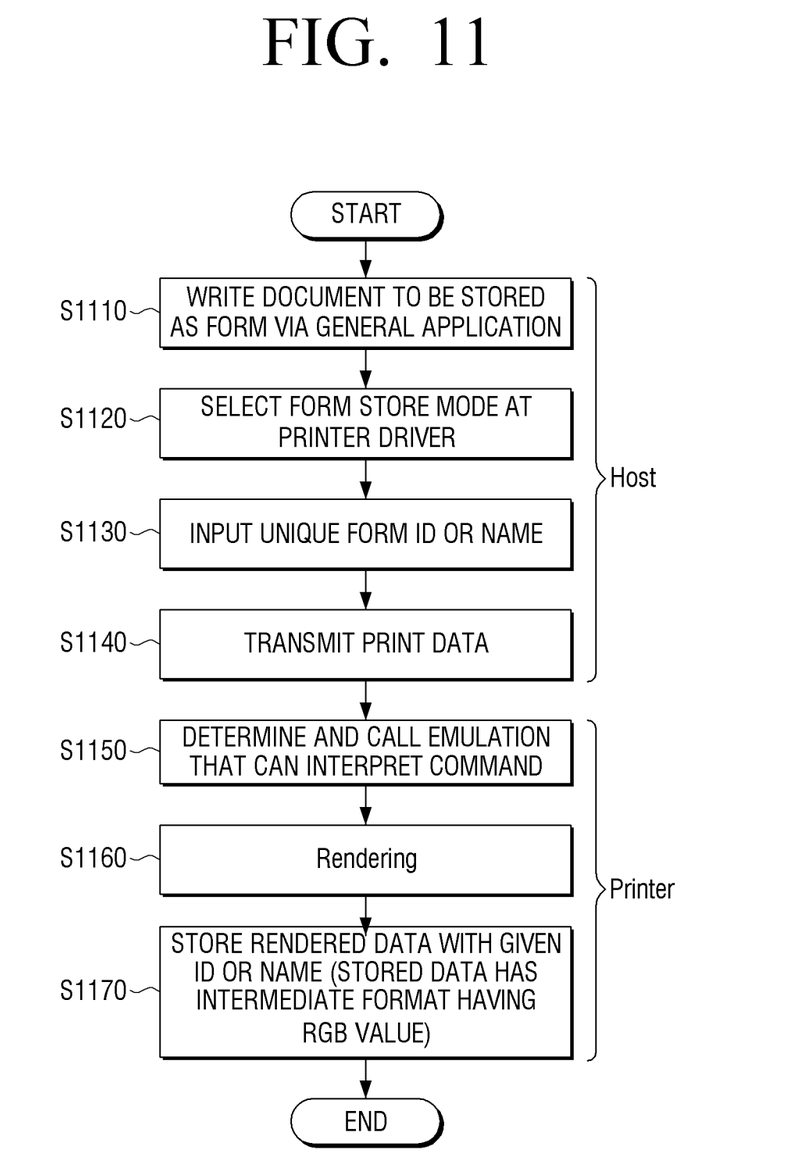
FIG. 11 is a flowchart illustrating an operation of registering a form according to an exemplary embodiment of the present general inventive concept.

FIG. 11 is a flowchart illustrating an operation of registering a form according to an exemplary embodiment of the present general inventive concept.

Referring to FIG. 11, a print control terminal device writes a document to be used as form data (Operation S1110). The print control terminal device sets form data to be applied to the document at a print driver (Operation S1120) and sets the ID or name of the form data (Operation S1130). The print control terminal device generates print data for the written document and transmits the print data used as form data to an image forming apparatus (Operation S1140).

The image forming apparatus receiving the print data determines an emulation suitable for the print data and calls the emulation (Operation S1150).

The image forming apparatus performs interpretation and rendering for the selected print data by using the called emulation to generate a rendering image with a plurality of tones (i.e. RGB data of 8 bits) (Operation S1160).

The image forming apparatus stores the generated rendering image with form data having a given ID or name (Operation S1170).

The method of registering a form according to an exemplary embodiment of the present general inventive concept stores form data as a rendering image having a plurality of tones, and thus the rendering image stored in the image forming apparatus 100 can be used in a different kind of apparatus.

A non-transitory computer readable medium means a medium which stores data semipermanently and can be read by a device, not a medium which stores data for a short time such as register, cache and memory. In detail, aforementioned various applications or programs may be provided by being stored in non-transitory computer-readable media such as CDs, DVDs, hard disks, blue-ray disks, USBs, memory cards and ROMs.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
    a storage unit configured to store a rendering image having a plurality of tones;
    a communication interface unit configured to receive print data;
    a rendering unit configured to render the received print data to a bitmap image;
    a mergence unit configured to merge the bitmap image and the rendering image into a single mergence image prior to generating binary data corresponding to either of the bitmap image and the rendering image;
    a binary coding unit configured to perform halftoning on the generated mergence image and to generate binary data corresponding to the mergence image, the binary data corresponding to the mergence image having fewer tones than either of the rendering image and the bitmap image; and
    a print engine unit configured to form an image on a paper by using the generated binary data.

2. The image forming apparatus of claim 1, wherein the storage unit stores a plurality of rendering images, and the communication interface unit receives information on one of the plurality of rendering images to be merged with the print data.

3. The image forming apparatus of claim 1, further comprising:
    a control unit configured to store the rendered bitmap image as an additional rendering image in the storage unit.

4. The image forming apparatus of claim 3, wherein the control unit compresses the rendered bitmap image to store the rendered bitmap image in the storage unit.

5. The image forming apparatus of claim 1, wherein the rendering image has an RGB format with 8 bit tones.

6. The image forming apparatus of claim 1, wherein the mergence unit Raster Operation Processing (ROP)-operates the bitmap image and the rendering image to merge the images.

7. The image forming apparatus of claim 1, wherein:
    the communication interface unit receives a mergence condition of the print data and the rendering image; and
    the mergence unit merges the bitmap image and the rendering image based on the received mergence condition.

8. The image forming apparatus of claim 1, further comprising:
    a user interface unit configured to receive a selection of a mergence condition of the print data and the rendering image,
    wherein the mergence unit merges the bitmap image and the rendering image based on the received mergence condition.

9. The image forming apparatus of claim 8, wherein the mergence condition is a transparency of the rendering image for the print data.

10. The image forming apparatus of claim 1, wherein the binary coding unit converts the color of the generated mergence image into a CMYK image, and performs halftoning on the CMYK image to generate binary data.

11. A method of forming an image with an image forming apparatus, the method comprising:
    receiving print data;
    rendering the received print data to a bitmap image;
    merging the bitmap image and a rendering image having a plurality of tones prestored in the image forming apparatus to generate a single mergence image prior to generating binary data corresponding to either of the bitmap image and the rendering image;
    performing halftoning on the generated mergence image and generating binary data corresponding to the mergence image, the binary data corresponding to the mergence image having fewer tones than either of the rendering image and the bitmap image; and
    forming an image on a print paper by using the generated binary data.

12. The method of claim 11, further comprising:
    storing a plurality of rendering images; and
    receiving information of one of the plurality of rendering images to be merged with the print data among the plurality of rendering images.

13. The method of claim 11, further comprising:
    storing the rendered bitmap image as an additional rendering image in the image forming apparatus.

14. The method of claim 13, wherein the storing comprises compressing the rendered bitmap image to store the rendered bitmap image in the image forming apparatus.

15. The method of claim 11, wherein the rendering image has an RGB format with 8 bit tones.

16. The method of claim 11, wherein the merging comprises ROP-operating the bitmap image and the rendered image to merge the images.

17. The method of claim 11, further comprising:
    receiving a mergence condition of the print data and the rendering image,
    wherein the merging comprises merging the bitmap image and the rendering image based on the received mergence condition.

18. The method of claim 11, further comprising:
receiving a selection of a mergence condition of the print data and the rendering image,
wherein the merging comprises merging the bitmap image and the rendering image based on the received mergence condition.

19. The method of claim 18, wherein the mergence condition is a transparency of the rendering image for the print data.

20. The method of claim 11, wherein the generating binary data comprises:
converting the color of the generated mergence image into a CMYK image; and
performing halftoning on the CMYK image to generate binary data.

21. A non-transitory computer-readable recording medium including computer-readable codes as a program to execute the method of claim 11.

22. An image forming apparatus comprising:
a mergence unit configured to merge a currently rendered image and a previously rendered image into a single mergence image prior to generating binary data corresponding to either of the currently rendered image and the previously rendered image;
a binary coding unit configured to generate binary data corresponding to the mergence image by performing halftoning on the mergence image, the binary data corresponding to the mergence image having fewer tones than either of the currently rendered image and the previously rendered image; and
a print engine unit configured to form an image using the generated binary data.

23. A method of forming an image, the method comprising:
merging a currently rendered image and a previously rendered image to generate a single mergence image prior to generating binary data corresponding to either of the currently rendered image and the previously rendered image;
generating binary data by performing halftoning on the mergence image, the binary data corresponding to the mergence image having fewer tones than either of the currently rendered image and the previously rendered image; and
forming an image using the generated binary data.

* * * * *